Patented Nov. 12, 1929

1,735,130

UNITED STATES PATENT OFFICE

JOSEPH ROBINSON, OF NEW YORK, N. Y.

AUTOMATIC TRAIN-PIPE COUPLING

Application filed June 15, 1921, Serial No. 477,760. Renewed July 14, 1928.

My invention relates to improvements in automatic train pipe couplings, and its object is to provide an improved support for such couplings which will permit free universal movement to the coupling head and which will be simple in construction, efficient in operation, and economical of manufacture.

I attain these objects by, and my invention resides in, the combinations, arrangements, and constructions hereinafter described, pointed out in the appended claims, and illustrated in the accompanying drawings in which:

Figure 1:
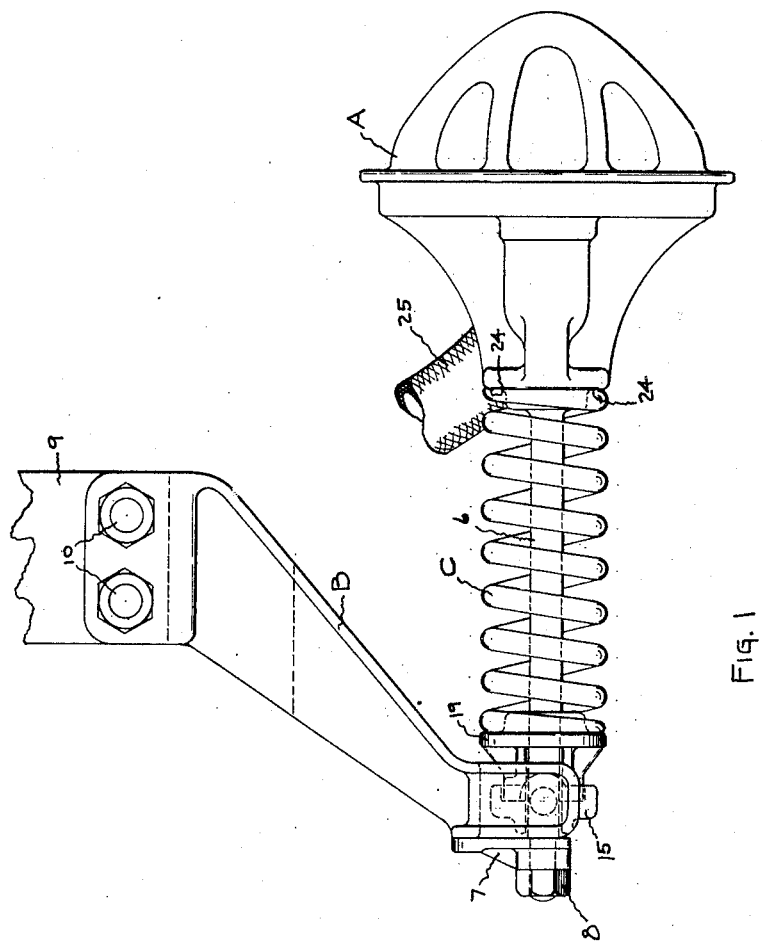
Figure 1 is a side elevation of my improvement.
Figure 2:
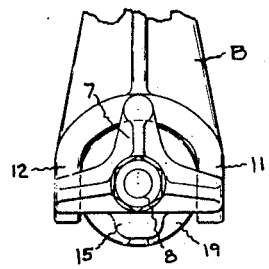
Figure 2 is a rear elevation thereof with the coupling head omitted and the upper portion of the bracket broken away.
Figure 3:
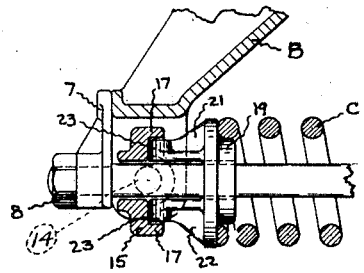
Figure 3 is a sectional elevation through my improvement, and showing particularly the universal joint. In this view the coupling head, and a part of the spring, are omitted.
Figure 4:
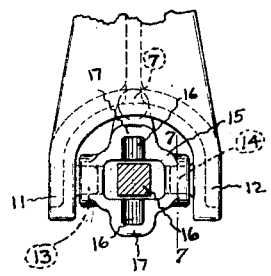
Figure 4 is a front view of the structure shown in Figure 3 with the spring C and the spring seat 19 omitted.
Figure 5:
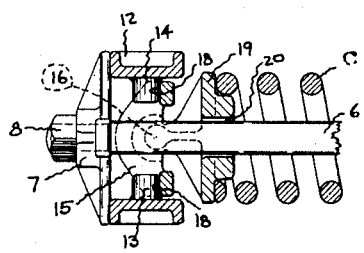
Figure 5 is a sectional plan view of the structure shown in Figures 2 and 3.

Referring now to the drawings: My improvement includes the usual coupling head A having a shank or part 6 rectangular in cross section, as shown. The shank extends rearwardly from the head, with which it is connected in any suitable manner, to a stop 7 at the rear of the bracket B, the stop being adjustably but firmly secured to the shank as by a nut 8. The bracket B is connected to the usual lug 9 of the car coupled as by bolts 10, and terminates at its lower end in a pair of vertically extending spaced prongs 11 and 12 which span the shank 6 and which are provided with inwardly extending trunnions 13 and 14, round in cross section and occupying, preferably, a common horizontal axis as shown particularly in Figure 5. Slipped over the shank 6, and through which the shank slidingly extends, I provide a hollow member or pivot block 15 having upon its front face a recessed bearing or seat 16 the upper and lower ends of which are closed by the walls 17. The pivot block spans the space between the prongs 11 and 12 of the bracket B and is provided at each end with a curved bearing or seat 18 into which the trunnions 13 and 14 extend and upon which the member 15 is adapted to rotate in the vertical plane. A spring seat 19 having an opening 20 through which the shank 6 non-rotatingly extends, is provided with a pair of lugs or projections 21 and 22 each having a curved face 23 adapted to rest in the bearing 16 of the member 15, upon which member the seat has rocking movement in the horizontal plane. The lugs 21 and 22 are spaced apart and lie on opposite sides of the opening 20 in the spring seat 19 as shown. A suitable compression spring C surrounds the shank 6 and rests at one end on the seat 19 and at the other end against an annular shoulder 24 formed at the rear side of the coupling head A. The spring serves to yieldingly sustain the head in front of the bracket B with the stop or projection 7 normally in engagement with the rear side of the bracket. The spring is of course under substantial initial compression the extent of which may be varied by turning the nut 8, thereby adjusting the projection 7 along the shank 6.

The usual train pipe hose 25 may be connected with the coupling head A in any suitable manner, while excessive rotation of the head about its longitudinal axis is prevented by the co-action of the shank 6, the spring seat 19, the pivot bar 15, and the bracket B.

Figure 6:
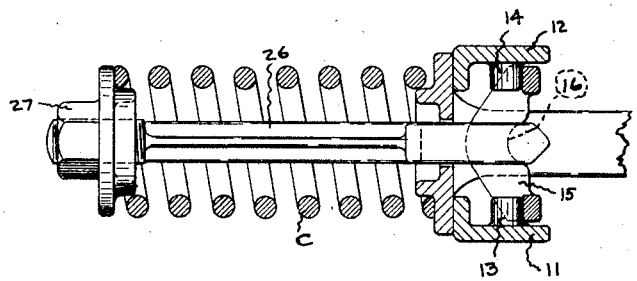
Figure 6 is a sectional plan view of a modification of my improvement.
Figure 7:
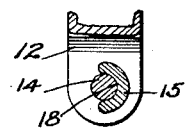
Figure 7 is a sectional detail on the line 7—7 of Figure 5.

In Figure 6 a modification of my improvement is shown. It consists in moving the spring C to the rear of the bracket B and pivotally supporting it by mounting a tie rod 26 on the front face of the pivot block 15 for rocking movement thereon, by which tie rod the spring is carried, a nut 27 serving to keep it in place. Except for the pivot block the hereindescribed method of pivotally mounting it on the prongs of the bracket B, this modification is in essentials a close approximation of the universal joint, or support, illustrated and described in my corresponding application Serial No. 342,806 filed December 5th, 1919, now Patent Number 1,630,582, granted May 31, 1927.

What I claim is:

1. In an automatic train pipe coupling, the combination of a bracket having at its lower end a pair of spaced prongs each of which is provided with an integral inwardly extending trunnion, said trunnions being located on a common axis and having a curved forward face, a hollow pivot block having curved seats into which said trunnions extend and having also a bearing on its front face, a spring seat pivotally mounted in said bearing, means at one end of the bearing for supporting the seat therein, a coupling head, a part extending from said head through said spring seat and said pivot block and co-operating with the seat and the block to prevent excessive rotation of said coupling head about the longitudinal axis of said part, a stop carried on the rear end of said part, and a spring surrounding the part and confined between said seat and said head for extending the latter with said stop yieldingly engaging the rear side of said bracket.

2. In an automatic train pipe coupling, the combination of a coupling head, a bracket having at its lower end a pair of spaced prongs each of which is provided with a trunnion, said trunnions being located on a common axis and having a curved forward face, a hollow pivot block consisting of two parallel walls joined at opposite ends by curved parts integral with said walls and located on the front side of said walls only, said curved parts forming seats which receive said trunnions, said pivot block having a bearing on its front face midway between said curved parts, a member extending from said coupling head through said hollow pivot block, a spring seat spanning said member and mounted in said bearing, a spring surrounding said member and seated on said spring seat, and a stop carried on the rear end of said member.

3. In an automatic train pipe coupling, the combination of a bracket having at its lower end a pair of spaced prongs each of which is provided with an integral inwardly extending trunnion, said trunnions being located on a common axis and having a curved forward face, a hollow pivot block having curved seats into which said trunnions extend and having also a bearing on its front face, a spring seat pivotally mounted in said bearing, said bearing having a wall opposite each end of said seat for preventing lateral movement of the seat relative to the bearing, a coupling head, a part extending from said head through said spring seat and said pivot block and co-operating with the seat and the block to prevent excessive rotation of said coupling head about the longitudinal axis of said part, a stop carried on the rear end of said part, and a spring surrounding the part and confined between said seat and said head for extending the latter with said stop yieldingly engaging the rear side of said bracket.

In testimony whereof I hereunto affix my signature.

JOSEPH ROBINSON.